(12) United States Patent
Galal

(10) Patent No.: US 6,380,946 B1
(45) Date of Patent: Apr. 30, 2002

(54) ENHANCING HARDWARE CLIPPING FOR BIT-PACKED FONTS

(75) Inventor: Gehad M. Galal, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/246,394

(22) Filed: Feb. 9, 1999

(51) Int. Cl.$^7$ ................................................ G06T 15/30
(52) U.S. Cl. ..................... 345/620; 345/622; 345/623; 345/624
(58) Field of Search .................. 345/434, 467, 345/470, 118, 344, 113, 141, 192, 421, 433, 191, 430, 441, 501, 620, 622, 623, 624, 628, 469.1; 382/164, 165, 171, 177, 196, 254, 256

(56) References Cited

U.S. PATENT DOCUMENTS

| | | | |
|---|---|---|---|
| 5,255,360 A | * 10/1993 | Peaslee et al. | 345/523 |
| 5,579,459 A | * 11/1996 | Jennyc | 345/434 |
| 5,771,034 A | * 6/1998 | Gibson | 345/141 |
| 5,966,136 A | * 10/1999 | Kurtz et al. | 345/434 |
| 6,005,574 A | * 12/1999 | Herrod | 345/344 |
| 6,061,047 A | * 5/2000 | Skelton | 345/118 |

* cited by examiner

Primary Examiner—Mark Zimmerman
Assistant Examiner—Thu-Thao Hawan
(74) Attorney, Agent, or Firm—Blakely, Sokoloff, Taylor & Zafman LLP

(57) ABSTRACT

The present invention is a method and apparatus for enhancing clipping a bit-packed glyph. A first clip value is determined if it is less than a first maximum value. If the first clip value exceeds the first maximum value, a second clip value and a third clip value are updated by a difference between the first clip value and the first maximum value, and the first clip value is replaced by the maximum value. Then, an address field value is updated by a predetermined address amount.

21 Claims, 4 Drawing Sheets

ENHANCING HARDWARE CLIPPING FOR BIT-PACKED FONTS

BACKGROUND

1. Field of the Invention

This invention relates to graphics processors. In particular, the invention relates to hardware clipping for bit-packed fonts.

2. Description of Related Art

Advances in graphics processor design have allowed many complex graphic operations to be performed at very high speed. In modern graphic processors, special hardware circuits have been designed to perform primitive operations. Examples of these operations include block transfers (BLT), color expansion, block fill, line drawing, area drawing, and transparency operations. To invoke these operations, a graphic driver usually has to configure the graphic processor with appropriate control parameters.

One useful application of graphics is the manipulation of textual fonts, or bit mapped objects. Among the operations that manipulate fonts, clipping is an important step to generate a primitive graphical object for further processing. A clipping operation extracts a rectangular region in the font object. To prepare for the clipping operation to be performed by the graphics processor, a graphic driver provides the desired clipping parameters to the hardware. These clipping parameters include the number of pixels to be clipped in all four directions: top, bottom, left, and right. The ranges of these parameters are usually limited due to the limited size of the control registers that hold the parameters. When the desired clipping parameters exceed these ranges, it is necessary to perform additional pre-clip operations before configuring the hardware clipping circuitry in the graphics processor. Since these pre-clip operations are not part of the hardware and are performed by the software in the graphic driver, they tend to be slow and inefficient. When the fonts or glyphs are represented by a bit packing scheme, the problem is even more complicated.

Therefore, there is a need in the technology to provide a simple and efficient method to enhance the hardware clipping ability for bit-packed fonts.

SUMMARY

In one embodiment, the present invention relates to a method for enhancing clipping a bit-packed glyph. The method comprises determining if a first clip value is less than a first maximum value. If the first clip value exceeds the first maximum value, a second clip value and a third clip value are updated by a difference between the first clip value and the first maximum value, and the first clip value is replaced by the maximum value. Then, an address field value is updated by a predetermined address amount.

BRIEF DESCRIPTION OF THE DRAWINGS

The features and advantages of the present invention will become apparent from the following detailed description of the present invention in which.

DESCRIPTION

The present invention is a method and apparatus for enhancing the hardware clipping ability of a graphics processor. The technique adjusts the clipping parameter values so that they fit within their respective ranges. The adjustment uses the right clip field for left clipping and vice versa depending on which clip field exceeds the allowable range. The top clip field and the starting address of the glyph are updated accordingly. The technique improves the graphics performance by eliminating a pre-clip operation by the graphics driver.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
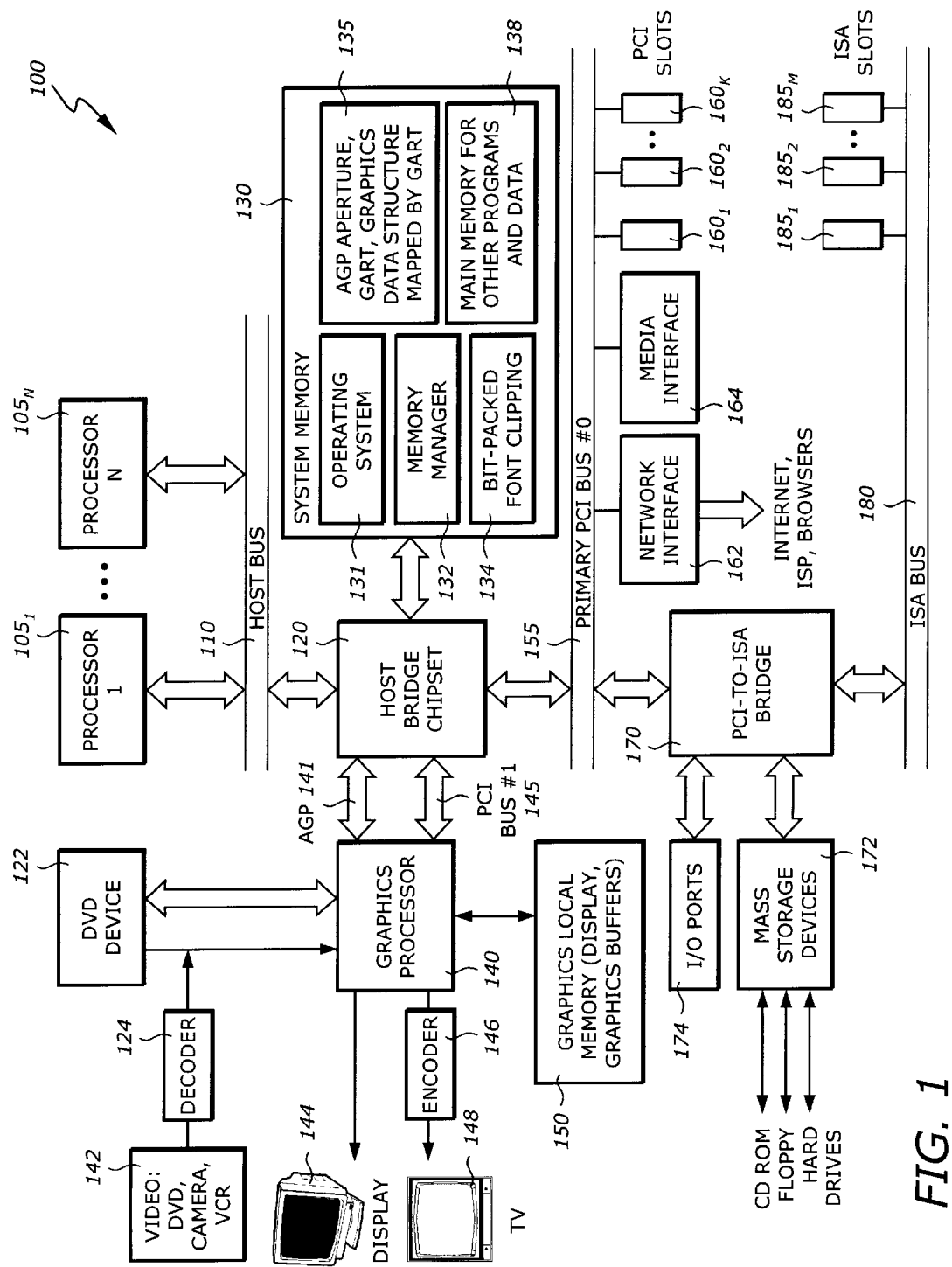
FIG. 1 is a diagram illustrating a computer system in which one embodiment of the invention can be practiced.

FIG. 1 is a diagram illustrating a computer system 100 in which one embodiment of the invention can be practiced. The computer system 100 includes N processors $105_1$ through $105_N$, a host bus 110, a host bridge chipset 120, a system memory 130, a graphics processor 140, a digital video disk (DVD) device 122, a video device 142, a decoder 124, a display monitor 144, a television (TV) 148, an encoder 146, a graphics local memory 150, a primary PCI bus #0 155, a PCI bus #1 145, an accelerated graphics port (AGP) 141, K PCI slots $160_1$ to $160_K$, a network interface 162, a media interface 164, a PCI-to-ISA bridge 170, mass storage devices 172, Input/Output (I/O) ports 174, an ISA bus 180, and ISA slots $185_1$ to $185_M$.

Each of the processors $105_1$ to $105_N$ represents a central processing unit of any type of architecture, such as complex instruction set computers (CISC), reduced instruction set computers (RISC), very long instruction word (VLIW), or hybrid architecture. The invention could be implemented in a multi-processor or single processor computer system.

The host bridge chipset 120 includes a number of interface circuits to allow the host processors $105_1$ to $105_N$ access to the system memory 130, the graphics processor 140, and the primary PCI bus #0 155. The system memory 130 represents one or more mechanisms for storing information. For example, the system memory 130 may include non-volatile or volatile memories. Examples of these memories include flash memory, read only memory (ROM), or random access memory (RAM). The system memory 130 includes an operating system (OS) 131, a memory manager 132, a bit-packed font clipping module 134, an AGP memory block 135, and other programs and data 138. Of course, the system memory 130 preferably contains additional software (not shown), which is not necessary to understanding the invention.

When implemented in software, the elements of the memory manager 132 and the bit-packed font clipping module 134 are essentially the code segments to manage memory and to enhance the hardware clipping ability of the graphics processor, respectively. The program or code segments can be stored in a processor readable medium. The "processor readable medium" may include any medium that can store or transfer information. Examples of the processor readable medium include an electronic circuit, a semiconductor memory device, a read-only memory (ROM), a flash memory, an erasable ROM (EROM), a floppy diskette, a compact disk (CD) ROM, an optical disk, a hard disk, a transmission medium, a fiber optic medium, a radio frequency (RF) link, etc. The PCI slots 160₁ to 160ₖ provide interfaces to PCI devices. Examples of PCI devices include the network interface 162 and the media interface 164. The network interface 162 connects to communication channel such as the Internet. The Internet provides access to on-line service providers, Web browsers, and other network channels. The media interface 164 provides access to audio and video devices.

The graphics processor 140 is a high performance graphics controller that perform graphics functions such as 3-D rendering operations, progressive meshes, painting, drawing, etc. The graphics processor 140 is coupled to the host bridge 120 via the AGP 141 and the PCI bus #1 145. In one embodiment, the AGP 141 is developed by Intel Corporation of Santa Clara, Calif. The graphics processor 140 has access to its own graphics local memory 150. The graphic local memory 150 may contain graphics programs and data for displaying. The DVD device 122 represents any digital video device or instrument. The video device 142 provides video input such as DVD, camera, or video cassette recorder (VCR) to the graphics processor 140. The decoder 124 decodes the video signals from the video device 142 to the graphics processor 140. The display monitor 144 displays the graphics as generated by the graphics processor 140. The encoder 146 receives the graphics data from the graphics controller 140 and encodes into an analog signal to be compatible for TV display on the TV set 148.

The PCI-to-ISA bridge provides access to the ISA bus 180, mass storage devices 172, and I/O ports 174. The mass storage devices 172 include CD ROM, floppy diskettes, and hard drives. The ISA bus 180 has a number of ISA slots 185₁ to 185ₘ to interface to ISA devices. Examples of ISA devices include data entry devices (e.g., keyboard, mouse), printers, etc.

Figure 2:
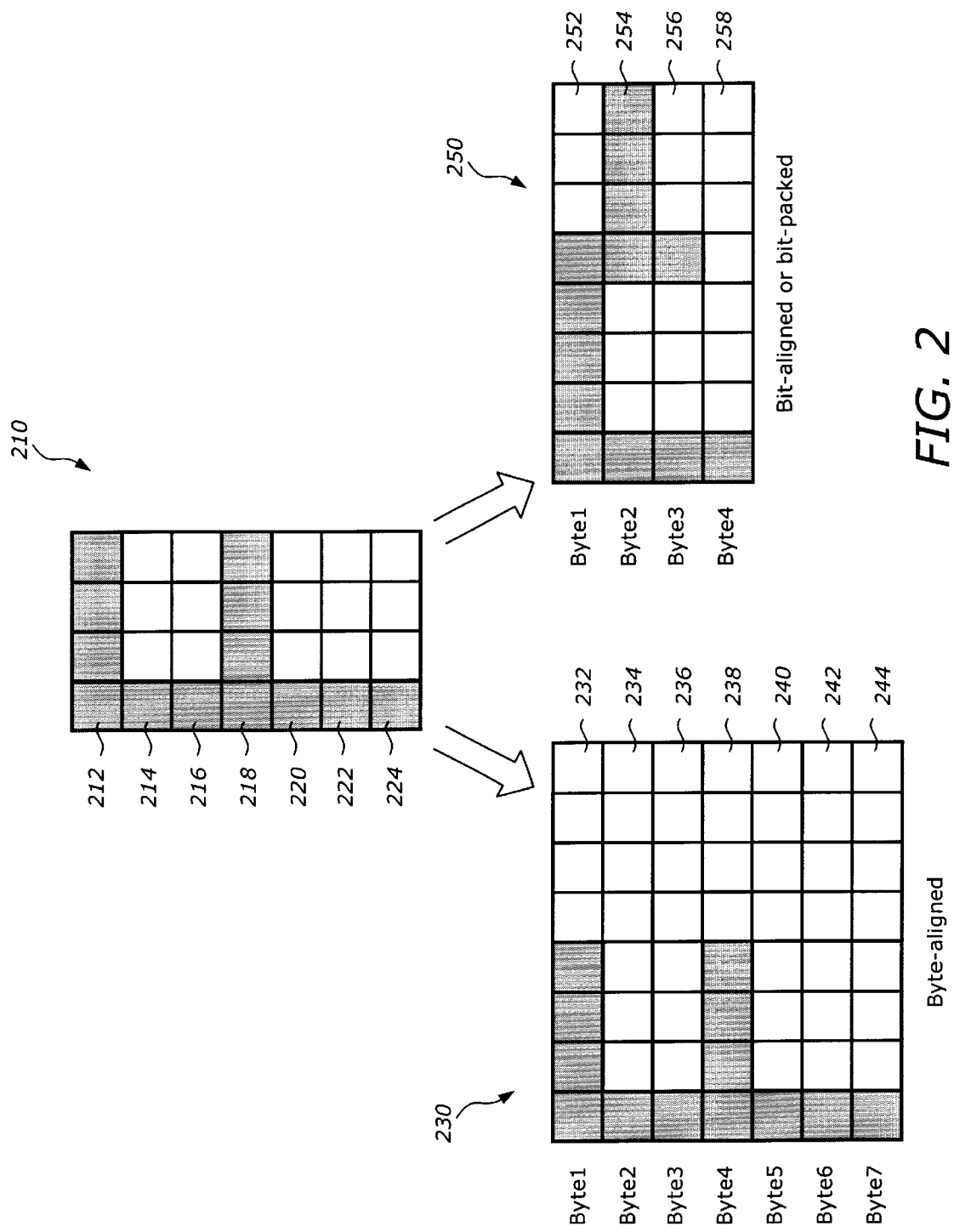
FIG. 2 is a diagram illustrating byte- and bit-packed fonts according to one embodiment of the invention.

FIG. 2 is a diagram illustrating byte- and bit-packed fonts according to one embodiment of the invention. In the following discussion, the terms "font" and "glyph" are used interchangeably. An original glyph 210 can be represented by a byte-aligned glyph 230 or a bit-aligned (or bit-packed) glyph 250.

In this illustrative example, the original glyph 210 is a letter F represented by a 4×7 matrix consisting of 7 rows 212, 214, 216, 218, 220, 222, and 224. Each row has 4 pixels. Each pixel corresponds to one bit. Since most memories are organized on a byte basis, it is preferable to represent the original glyph such that each row corresponds to a byte. There are essentially two ways to do this: byte alignment and bit alignment. For byte-aligned fonts, each scanline (or row) is padded from the right by dummy bits so that each scanline occupies an integral number of bytes. For bit-aligned, or bit-packed, fonts, no scanline padding is done. Each scanline follows the previous one even if it does not start on a byte boundary.

The byte-aligned glyph 230 represents the original glyph 210 on a byte basis by padding additional bits to each row to occupy a byte. Rows 212, 214, 216, 218, 220, 222, and 224 in the original glyph 210 become rows 232, 234, 236, 238, 240, 242, and 244 in the byte-aligned glyph 230, respectively. Although the byte-aligned glyph 230 is easy to construct, it wastes memory space because of the padded bits to each row of the original glyph 210.

The bit-packed glyph 250 represents the original glyph 210 by packing the bits of the original glyph 210 in forming a byte. In this illustrative example, rows 212 and 214 are packed to form row 252, rows 216 and 218 are packed to form row 254, rows 220 and 222 are packed to form row 256, and row 224 and padding bits are packed to form row 258. The bit-packed glyph 250 therefore uses memory efficiently. The memory saving becomes even more significant when there are many fonts or glyphs, or when the fonts or glyphs are of large sizes.

In addition to reduced memory storage, the bit-packed fonts also provide improved graphics performance. For example, when the fonts are cached to the local graphics memory (or AGP), the number of system-to-local memory copies is reduced, resulting in faster data transfers.

The main disadvantage of using bit-packed fonts, however, is that they require bit-level manipulation by the device driver when the clipping is limited. Using the technique in the present invention, bit-level manipulation by the device driver is eliminated, and the clipping can be performed by hardware even when the clipping exceeds the allowable range supported by the hardware.

Figure 3:
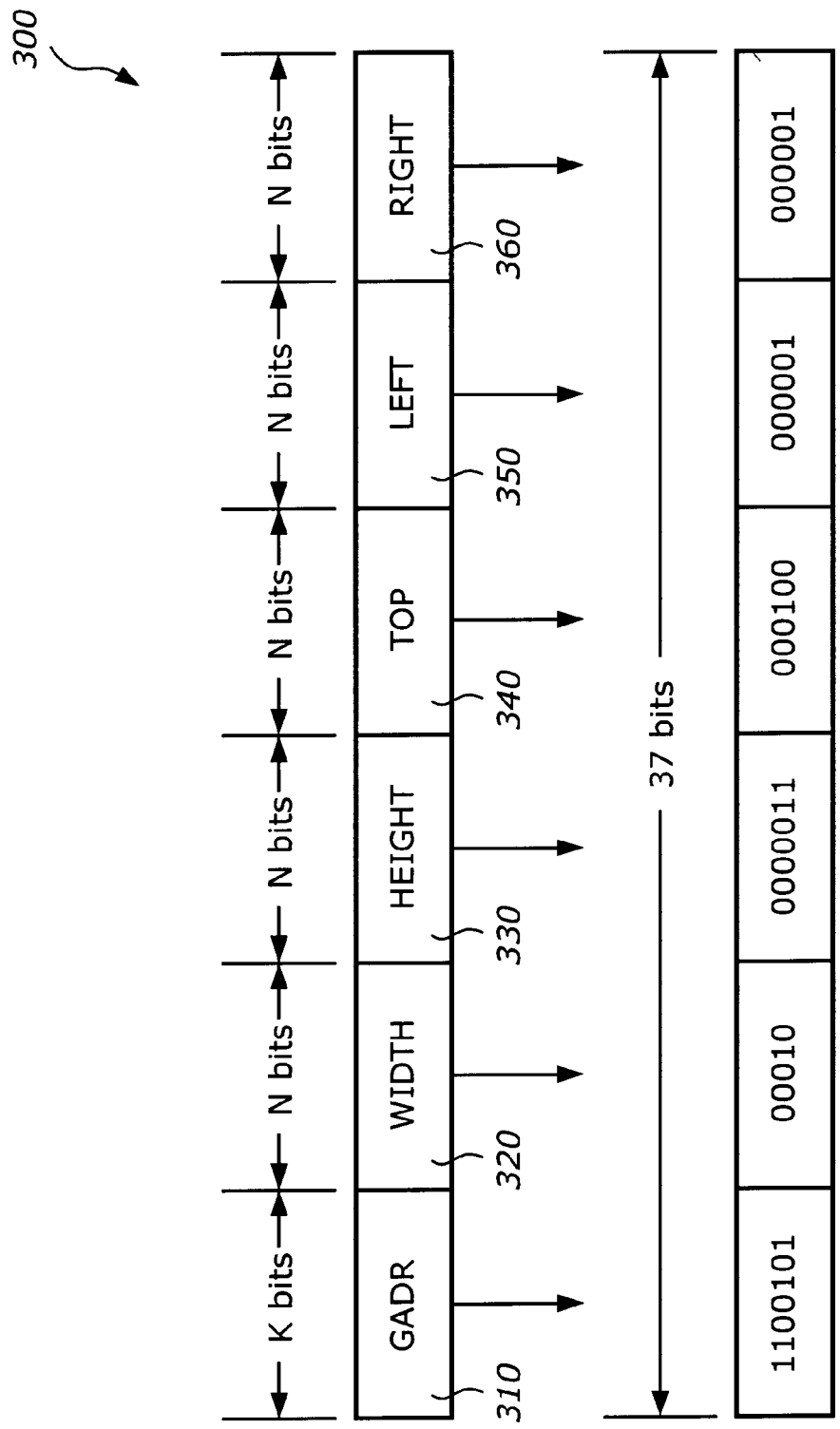
FIG. 3 is a diagram illustrating the control word for the font clipping.

FIG. 3 is a diagram illustrating the control word 340 for the font clipping. The control word 340 includes a graphics address field GADR 310, a width field WIDTH 320, a height field HEIGHT 330, a top field TOP 340, a left field LEFT 350, and a right field RIGHT 360.

In this illustrative example, the width, height, top, left, and right fields 320, 330, 340, 350, and 360 have N bits, while the GADR field 310 has K bits. In the numerical example, N is 6 and K is 7 so that the total number of bits is 37. As is known by one skilled in the art, the size of the fields can be any appropriate number of bits.

The GADR 310 stores the start address of the glyph. This start address corresponds to the upper left corner of the glyph. When a glyph is clipped from the top, the start address is updated to reflect the new start address based on the result of the top clipping. The start address therefore is updated based on the amount of the top clipping. In addition, for bit-packed fonts, the updating of the start address also takes into account the number of bytes that are packed into one row of the resulting bit-packed font.

The WIDTH 320 and HEIGHT 330 store the resulting width and height of the clipped glyph. The TOP 340 stores the number of pixels to be discarded from the start of the glyph to reach the first significant scanline. The LEFT 350 stores the number of pixels to be discarded from the start of each scanline to reach the first significant pixel. In other words, the LEFT 350 represents the amount of pixels to be clipped from the left of the glyph. The RIGHT 360 stores the number of pixels to be skipped after the number of pixels in the WIDTH 320 to reach the end of a scanline. In other words, the RIGHT 360 represents the amount of pixels to be clipped from the right of the glyph.

The TOP 340 is necessary because after clipping a glyph from the top, the first scanline may not start at the beginning of a byte. Since the graphics processor may need the byte address, this start address is byte aligned using the TOP 340. The bottom clipping is not needed because this can be provided by adjusting the height accordingly.

FIG. 3 also illustrates a numerical example for the following clipping operation: Clip the 4×7 glyph given in FIG. 2 three pixels (rows) from the top, one from the left, one from the right, and one from the bottom. Suppose the start address of the original glyph is 100 (decimal). For this clipping, the control parameters are computed as follows:

WIDTH=original width−left clipping−right clipping=4−1−1=2

HEIGHT=height−top clipping−bottom clipping=7−3−1=3

GADR=original address+floor of the number of bytes clipped from top=100+1=101
TOP=number of pixels to be discarded from the first byte=4
LEFT=left clipping=1
RIGHT=right clipping=1

Suppose the GADR is 7-bit field, the WIDTH 320, HEIGHT 330, TOP 340, LEFT 350, and RIGHT 360 are all 6-bit fields, then the above values are converted to binary numbers as shown in FIG. 3.

Enhancing clipping:

If the desired clipping parameters are within the ranges provided by the control fields, then there is no adjustment and the device driver can configure the hardware accordingly. If the sum of the right clip and the left clip exceeds the sum of the maximum values of the right and left ranges, then the clipping is also performed by the graphics driver in the pre-clipping operation. If, however, any of the clipping parameters exceeds the corresponding range, the desired clipping parameters need to be adjusted to fit within the allowable ranges without causing incorrect result. This adjustment allows a clipping size to be larger than the field size, thus enhancing the clipping ability of the graphics processor.

For example, suppose the field size of the clipping parameters is 6-bit, allowing the clipping of up to 64 pixels. If a glyph is constructed to have a width size of 127 pixels, then it is desirable to be able to clip up to the maximum allowable size, i.e., up to 127 pixels. However, because of the limited field size, any clipping size exceeding 63 pixels cannot be directly applied.

To accommodate larger clipping sizes, the following technique is used:

If the sum of the right clip and the left clip exceeds the sum of the maximum values of the right and left ranges, then the clipping is performed by the graphics driver in the pre-clipping operation. If the right clip is larger than the maximum right range, add the extra right clip size to the left clipping. If the left clip is larger than the maximum left range, add the extra left clip to the right clipping. To adjust the clipping of the first line, the top field is incremented or decremented accordingly. If the top field goes out of its range after the adjustment, the start address field is modified so that the top field is adjusted back in its range. The adjustment of the start address field needs not be a full quadword because it depends on how much out of range the top field is.

The above technique therefore enhances the clipping ability of the graphics processor by twice the size of the allowable range of the clipping parameters. This enhancement is achieved with only a few adjustment operations. Thus, the processing speed is significantly faster than using a preclip operation in the graphics driver.

The enhancing clipping technique can be implemented as a computer program stored on a computer readable medium such as CD ROM, floppy diskette, hard disk, optical disks, etc. The computer program has computer readable program code that performs the functions for the enhancing clipping as described above.

Figure 4:
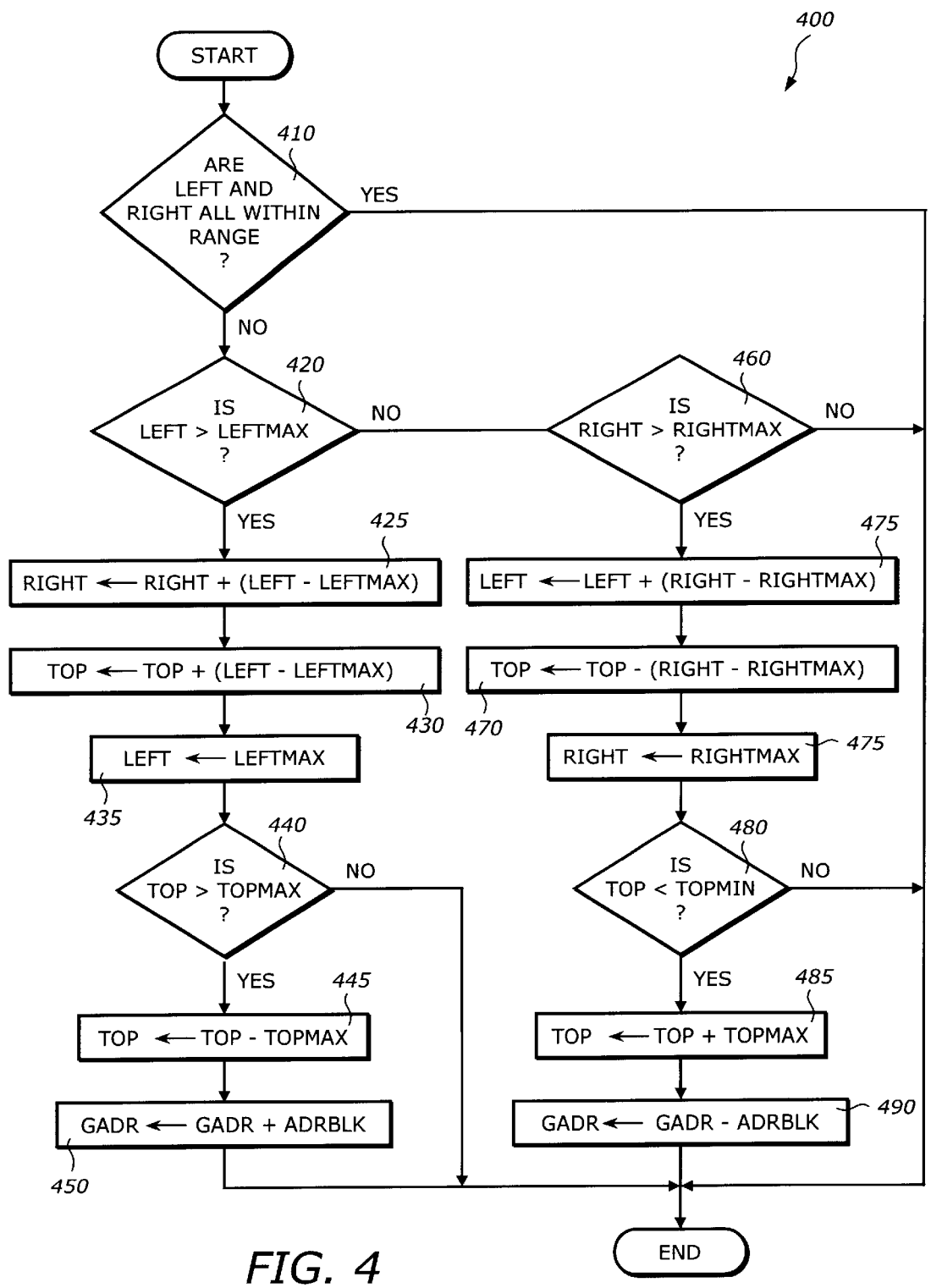
FIG. 4 is a flowchart illustrating a process to enhance the hardware clipping for bit-packed fonts.

FIG. 4 is a flowchart illustrating a process 400 to enhance the hardware clipping for bit-packed fonts.

Upon START, the process 400 determines if the values in the left and the right fields are within the proper range (Block 410). This includes a determination if the sum of the left clip and the right clip (LEFT+RIGHT) is less than the sum of the maximum values of the left and the right fields (LEFTMAX+RIGHTMAX). If they are within the range, then the process 400 does not need to provide enhancement operations and is terminated. In addition, if (LEFT+RIGHT) is greater than (LEFTMAX+RIGHTMAX), then the process 400 is also terminated and the clipping is done by the graphics driver. Otherwise, the process 400 proceeds to determine if the left field value LEFT exceeds the maximum value of the left field, LEFTMAX (Block 420). If not, the process 400 proceeds to block 460. If the left field value exceeds LEFTMAX, the process 400 begins to perform enhancing operations.

The process 400 increments the right field value by an amount equal to the difference between the left field value and the maximum value of the left field (LEFT−LEFTMAX) (Block 425). Next, the process 400 increments the top field value TOP by the (LEFT−LEFTMAX) amount (Block 430). Then the process 400 changes LEFT to LEFTMAX (Block 435). Next, the process 400 determines if TOP is greater than the maximum value of the top field, TOPMAX (Block 440). If not, the process 400 is terminated. If TOP is greater than TOPMAX, the process 400 decrements the top field value by TOPMAX (Block 445). Next, the process 400 updates the GADR field by incrementing the GADR field with a predetermined address block amount, ADRBLK (Block 450). The process 400 is then terminated.

In block 460, the process 400 determines if the right field value, RIGHT, exceeds the maximum value of the right field, RIGHTMAX. If not, the process 400 is terminated. Otherwise, the process 400 increments the left field value, LEFT, by an amount equal to the difference between the right field value, RIGHT, and the maximum value of the right field, (RIGHT RIGHTMAX) (Block 465). Then, the process 400 decrements the top field value, TOP, by the (RIGHT−RIGHTMAX) amount (Block 470). Next, the process 400 changes RIGHT to RIGHTMAX (Block 475). Next, the process 400 determines if TOP is less than the minimum value of the top field, TOPMIN (Block 480). If not, the process 400 is terminated. If TOP is less than TOPMIN, the process 400 increments the top field value by the maximum value of the top field, TOPMAX (Block 485). Next, the process 400 updates the GADR field by decrementing the GADR field with a predetermined address block amount, ADRBLK (Block 490). The process 400 is then terminated.

Therefore, the present invention is a technique to enhance the hardware clipping ability of the graphics device when the clipping exceeds the corresponding bit field. The technique improves the graphics clipping performance by eliminating the pre-clip operation in the graphics driver.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   determining if a first clip value is less than a first maximum value of one of a right range and a left range;
   if the first clip value exceeds the first maximum value
      updating a second clip value and a third clip value by a difference between the first clip value and the first maximum value, and
      replacing the first clip value by the first maximum value; and
   updating an address field value by a predetermined address amount.

2. The method of claim 1 further comprises:
adjusting the updated third clip value by a second maximum value if the updated third clip value is greater than the second maximum value, the second maximum value being a maximum value of a top range.

3. The method of claim 1 further comprises:
adjusting the updated third clip value by the second maximum value if the updated third clip value is less than a minimum value.

4. The method of claim 1 wherein the first clip value corresponds to a left clipping and the second clip value corresponds to a right clipping.

5. The method of claim 4 wherein the third clip value corresponds to a top clipping.

6. The method of claim 1 wherein the first clip value corresponds to a right clipping and the second clip value corresponds to a left clipping.

7. The method of claim 6 wherein the third clip value corresponds to a top clipping.

8. A computer program product comprising:
a computer usable medium having computer program code embodied therein for enhancing clipping a bit-packed glyph, the computer program product having:
computer readable program code for determining if a first clip value is less than a first maximum value of one of a right range and a left range;
computer readable program code for, if the first clip value exceeds the first maximum value,
updating a second clip value and a third clip value by a difference between the first clip value and the first maximum value, and
replacing the first clip value by the first maximum value; and
computer readable program code for updating an address field value by a predetermined address amount.

9. The computer program product of claim 8 further comprises:
computer readable program code for adjusting the updated third clip value by a second maximum value if the updated third clip value is greater than the second maximum value, the second maximum value being a maximum value of a top range.

10. The computer program product of claim 8 further comprises:
computer readable program code for adjusting the updated third clip value by the second maximum value if the updated third clip value is less than a minimum value.

11. The computer program product of claim 8 wherein the first clip value corresponds to a left clipping and the second clip value corresponds to a right clipping.

12. The computer program product of claim 11 wherein the third clip value corresponds to a top clipping.

13. The computer program product of claim 8 wherein the first clip value corresponds to a right clipping and the second clip value corresponds to a left clipping.

14. The computer program product of claim 13 wherein the third clip value corresponds to a top clipping.

15. A system comprising:
a host processor;
a graphics processor coupled to the host processor, the graphics processor to clip a bit-packed glyph using first, second, and third clip values;
a memory coupled to the graphics processor, the memory including program code to enhance the clipping by the graphics processor, the program code, when executed by the host processor, causing the host processor to determine if the first clip value is less than a first maximum value of one of a right range and a left range;
if the first clip value exceeds the first maximum value
update the second clip value and the third clip value by a difference between the first clip value and the first maximum value, and
replace the first clip value by the first maximum value; and
update an address field value by a predetermined address amount.

16. The system of claim 15 wherein the program code further causes the host processor to:
adjust the updated third clip value by a second maximum value if the updated third clip value is greater than the second maximum value, the second maximum value being a maximum value of a top range.

17. The system of claim 15 wherein the program code further causes the host processor to:
adjust the updated third clip value by the second maximum value if the updated third clip value is less than a minimum value.

18. The system of claim 15 wherein the first clip value corresponds to a left clipping and the second clip value corresponds to a right clipping.

19. The system of claim 18 wherein the third clip value corresponds to a top clipping.

20. The system of claim 15 wherein the first clip value corresponds to a right clipping and the second clip value corresponds to a left clipping.

21. The system of claim 20 wherein the third clip value corresponds to a top clipping.

* * * * *